United States Patent
Mitra et al.

(10) Patent No.: US 12,008,625 B2
(45) Date of Patent: *Jun. 11, 2024

(54) SYSTEMS AND METHODS FOR ESTIMATING PERSONAL REPLENISHMENT CYCLES

(71) Applicant: Walmart Apollo, LLC, Bentonville, AR (US)

(72) Inventors: Abhimanyu Mitra, San Jose, CA (US); Kannan Achan, Saratoga, CA (US); Venkata Syam Prakash Rapaka, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 427 days.

This patent is subject to a terminal disclaimer.

(21) Appl. No.: 17/321,922

(22) Filed: May 17, 2021

(65) Prior Publication Data

US 2021/0272181 A1    Sep. 2, 2021

Related U.S. Application Data

(63) Continuation of application No. 16/121,576, filed on Sep. 4, 2018, now Pat. No. 11,010,814.

(Continued)

(51) Int. Cl.
*G06Q 30/00* (2023.01)
*G06F 16/9535* (2019.01)
(Continued)

(52) U.S. Cl.
CPC ..... *G06Q 30/0631* (2013.01); *G06F 16/9535* (2019.01); *G06F 16/955* (2019.01); *G06Q 10/04* (2013.01); *G06Q 10/087* (2013.01)

(58) Field of Classification Search
None
See application file for complete search history.

(56) References Cited

U.S. PATENT DOCUMENTS

| | | |
|---|---|---|
| 6,204,763 B1 | 3/2001 | Sone |
| 6,249,774 B1 | 6/2001 | Roden et al. |

(Continued)

OTHER PUBLICATIONS

Corsten, D., "Desperately Seeking Shelf Availability: An Examination of the Extent, the Causes, and the Efforts to Address Retail Out-of-Stocks," International Journal of Retail & Distribution Management; 2003; 31, 11/12, pp. 605-617 (Year: 2003) 2003.

*Primary Examiner* — Naeem U Haq
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform: coordinating displaying a personalized list of recommended items on a graphical user interface of a user device of a user; determining a personal replenishment cycle for an item of a set of items previously purchased by the user; increasing available storage space in the one or more non-transitory computer-readable media of the system by removing a first item from the set of items to identify that the user has stopped purchasing the first item; and increasing a network bandwidth of the system by reducing a number of database requests for the set of items previously purchased by the user. Other embodiments are disclosed.

20 Claims, 9 Drawing Sheets

400

405 – Applying a first set of rules to historical sales data available to a retailer to detect a personal replenishment cycle for an item of a set of items purchased by a customer.

410 – Applying a second set of rules to identify if the customer has stopped purchasing the item.

415 – Applying a third set of rules to the personal replenishment cycle for the item to identify a personalized list of recommended items for the customer to consider replenishing.

420 – Coordinating displaying the personalized list of recommended items on an interface of a customer electronic device of the customer.

Related U.S. Application Data

(60) Provisional application No. 62/553,673, filed on Sep. 1, 2017.

(51) Int. Cl.
*G06F 16/955* (2019.01)
*G06Q 10/04* (2023.01)
*G06Q 10/087* (2023.01)
*G06Q 30/0601* (2023.01)

(56) References Cited

U.S. PATENT DOCUMENTS

| | | |
|---|---|---|
| 6,963,851 B1 | 11/2005 | Szabo |
| 7,130,814 B1 | 10/2006 | Szabo et al. |
| 8,126,784 B1 | 2/2012 | Agarwal |
| 8,321,303 B1 | 11/2012 | Krishnamurthy |
| 8,374,925 B2 | 2/2013 | Liamos et al. |
| 2012/0053951 A1 | 3/2012 | Kowalchuk et al. |
| 2013/0124361 A1 | 5/2013 | Bryson |
| 2015/0186836 A1 | 7/2015 | Chouhan et al. |
| 2015/0294333 A1 | 10/2015 | Avegliano et al. |
| 2018/0157993 A1 | 6/2018 | Northrup |

400

| 405 – Applying a first set of rules to historical sales data available to a retailer to detect a personal replenishment cycle for an item of a set of items purchased by a customer. |
|---|

| 410 – Applying a second set of rules to identify if the customer has stopped purchasing the item. |
|---|

| 415 – Applying a third set of rules to the personal replenishment cycle for the item to identify a personalized list of recommended items for the customer to consider replenishing. |
|---|

| 420 – Coordinating displaying the personalized list of recommended items on an interface of a customer electronic device of the customer. |
|---|

FIG. 4

SYSTEMS AND METHODS FOR ESTIMATING PERSONAL REPLENISHMENT CYCLES

CROSS-REFERENCE TO RELATED APPLICATIONS

This application is a continuation of U.S. patent application Ser. No. 16/121,576, filed Sep. 4, 2018, to be issued as U.S. Pat. No. 11,010,814, which claims the benefit of U.S. Provisional Application No. 62/553,673, filed Sep. 1, 2017. U.S. patent application Ser. No. 16/121,576 and U.S. Provisional Application No. 62/553,673 are incorporated herein by reference in their entirety.

TECHNICAL FIELD

This disclosure related to systems and methods for estimating personal replenishment cycles.

BACKGROUND

Computer systems can involve learning systems used to identify a list of recommendations for a user. Recommendation systems can involve providing a personalized list of recommendations based on personalized content.

BRIEF DESCRIPTION OF THE DRAWINGS

To facilitate further description of the embodiments, the following drawings are provided in which:

FIG. 4 is a flowchart for a method, according to certain embodiments;

Figure 1:
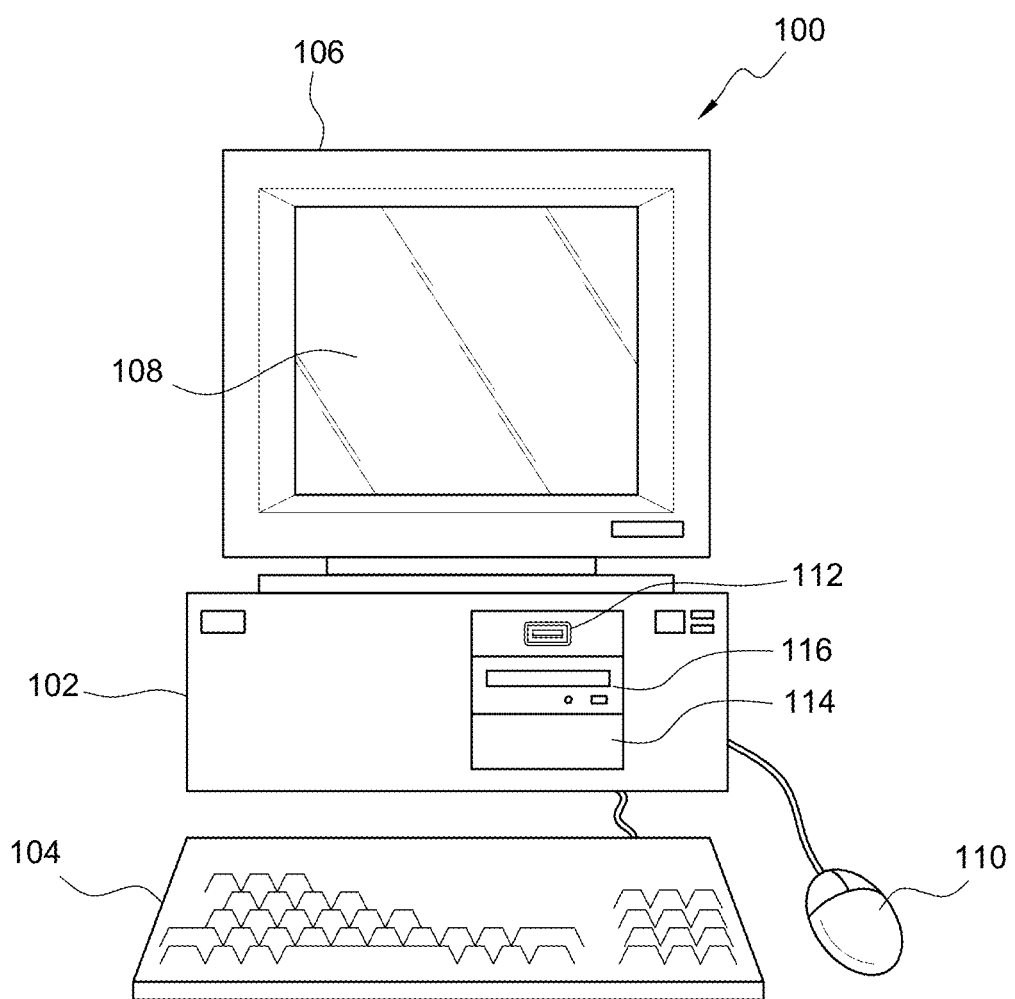
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques can be omitted to avoid unnecessarily obscuring the present disclosure. Additionally, elements in the drawing figures are not necessarily drawn to scale. For example, the dimensions of some of the elements in the figures can be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
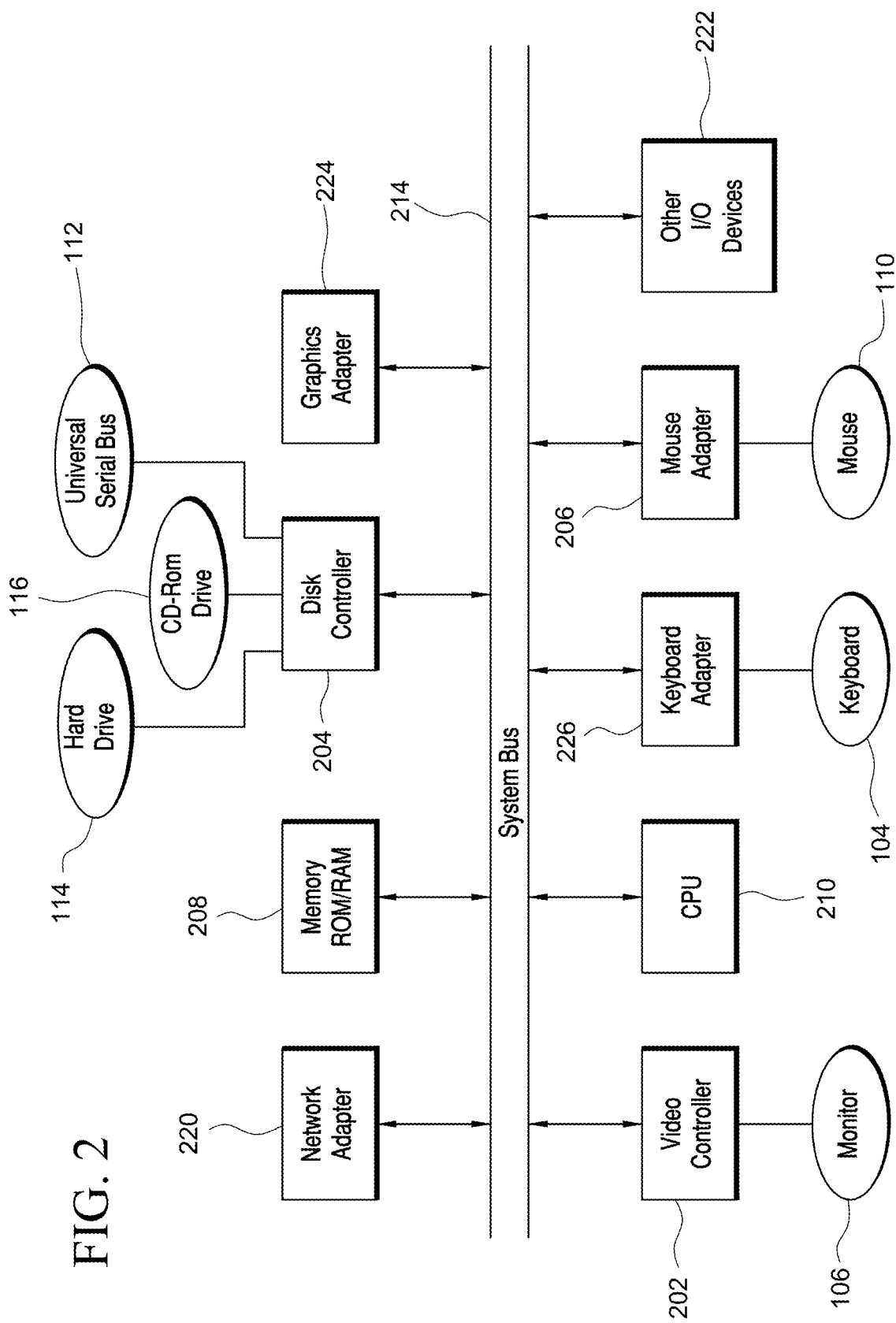
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the computing instructions described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-volatile memory and/or (ii) volatile memory. The some embodiments, the non-volatile memory can include computer-readable media.

In various examples, portions of the memory storage system(s) of the various embodiments disclosed herein (e.g., portions of the non-volatile memory storage system(s)) can be encoded with a boot code sequence suitable for restoring computer system 100 (FIG. 1) to a functional state after a system reset. In addition, portions of the memory storage system (s) of the various embodiments disclosed herein (e.g., portions of the non-volatile memory storage system(s)) can comprise microcode such as a Basic Input-Output System (BIOS) operable with computer system 100 (FIG. 1). In the same or different examples, portions of the memory storage system(s) of the various embodiments disclosed herein (e.g., portions of the non-volatile memory storage system(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on memory storage unit 208 can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile electronic device, such as a smartphone. In certain additional embodiments, computer system 100 can comprise an embedded system.

Many users of online retailers and/or brick and mortar stores buy certain items on a regular basis for a certain time period. Even if two users buy the same item regularly, however, there can be a significant difference in how frequently each user buys the item. For example, a first user might buy a particular item every three months, while a second user might buy the same item every four months. Moreover, two different users currently replenishing an item on a regular basis might stop doing so at different times.

To recommend the correct set of items that a user might want to replenish at any given time point, an estimate of the user's personal replenishment cycles for different items is needed. Such an estimate, however, can be difficult to determine. For example, data available to a retailer on when a user replenishes can sometimes comprise only partial data because the user might not always choose to replenish from the same retailer. Thus, if only the historical sales data of a retailer is reviewed to assess how frequently a user chose to replenish an item, data containing valuable information about the replenishment pattern for the item for a user can be missed each time the user chose to replenish the item from a different retailer. As described in greater detail below, various systems and methods contemplated herein allow a retailer to estimate personal replenishment cycle lengths for each user and each item from only the historical sales data available to a retailer. Also, for each item, methods and systems of identifying users who have stopped replenishing the item are described. Furthermore, methods and systems of combining all of this derived information to build a personalized list for each user at any given time point is described. The personalized list for each user can comprise recommended items that the user might want to replenish.

Figure 3:
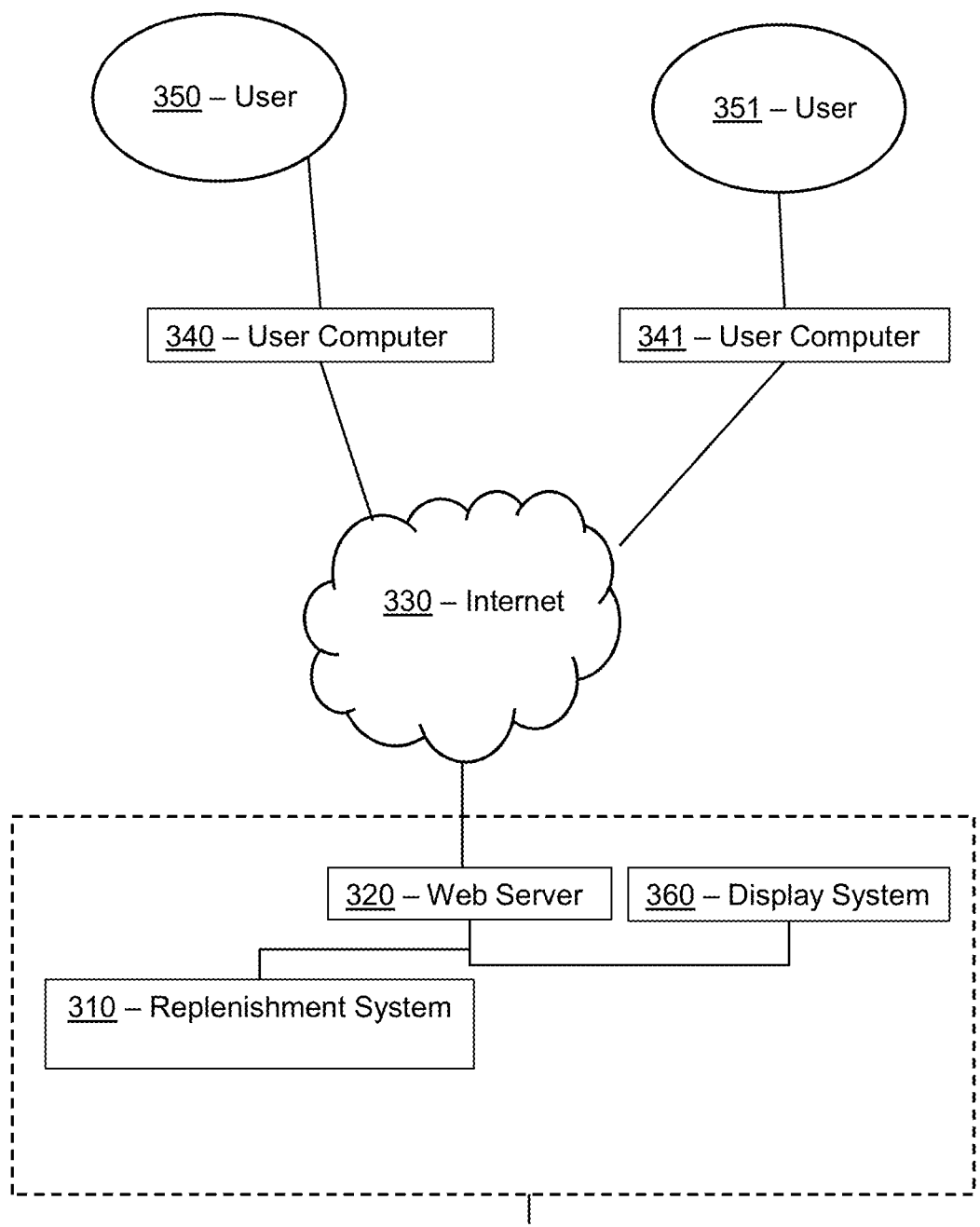
FIG. 3 illustrates a representative block diagram of a system, according to an embodiment.

Turning ahead in the drawings, FIG. 3 illustrates a block diagram of a system 300 that can be employed for estimating personal replenishment cycles, as described in greater detail below. System 300 is merely exemplary and embodiments of the system are not limited to the embodiments presented herein. System 300 can be employed in many different embodiments or examples not specifically depicted or described herein. In some embodiments, certain elements or engines and/or systems of system 300 can perform various procedures, processes, and/or activities. In these or other embodiments, the procedures, processes, and/or activities can be performed by other suitable elements or engines and/or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a replenishment system 310, a web server 320, and a display system 360. Replenishment system 310, web server 320, and/or display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of replenishment system 310, web server 320, and/or display system 360. Additional details regarding replenishment system 310, web server 320, and display system 360 are described herein. In these or other embodiments, replenishment system 310, web server 320, and/or display system 360 can be located spatially apart from each other. In these or other embodiments, replenishment system 310, web server 320, and/or display system 360 can communicate with each other.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host a website with items for sale that allows users to browse and/or search for items, to add items to an electronic cart, and/or to purchase items, in addition to other suitable activities.

In many embodiments, replenishment system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processor(s) and/or the memory storage system(s) of replenishment system 310, web server 320, and/or display system 360 in a wired manner and/or a wireless manner, and the coupling can be direct and/or indirect, as well as locally and/or remotely. As an example of an indirect manner (which can or cannot also be a remote manner), a keyboard-video-mouse (KVM) switch can be used to couple the input device(s) and the display device(s) to the processor(s) and/or the memory storage system(s). In some embodiments, the KVM switch also can be part of replenishment system 310, web server 320, and/or display system 360. In a similar manner, the processor(s) and the memory storage system(s) can be local and/or remote to each other.

In many embodiments, replenishment system 310, web server 320, and/or display system 360 can be configured to communicate with one or more user computers 340 and 341. In some embodiments, user computers 340 and 341 also can be referred to as user computers. In some embodiments, replenishment system 310, web server 320, and/or display system 360 can communicate or interface (e.g., interact) with one or more user computers (such as user computers 340 and 341) through a network or internet 330. Internet 330 can be an intranet that is not open to the public. Accordingly, in many embodiments, replenishment system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as users, in which case, user computers 340 and 341 can be referred to as user computers. In these or other embodiments, the operator and/or administrator of system 300 can manage system 300, the processor(s) of system 300, and/or the memory storage system(s) of system 300 using the input device(s) and/or display device(s) of system 300.

Meanwhile, in many embodiments, replenishment system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage systems (e.g., non-transitory memory storage system(s)), which can be similar or identical to the one or more memory storage system(s) (e.g., non-transitory memory storage system(s)) described above with respect to computer system 100 (FIG. 1). Also, in some embodiments, for any particular database of the one or more databases, that particular database can be stored on a single memory storage system of the memory storage system(s), and/or the non-transitory memory storage system(s) storing the one or more databases or the contents of that particular database can be spread across multiple ones of the memory storage system(s) and/or non-transitory memory storage system(s) storing the one or more databases, depending on the size of the particular database and/or the storage capacity of the memory storage system(s) and/or non-transitory memory storage system(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, communication between replenishment system 310, web server 320, and/or display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
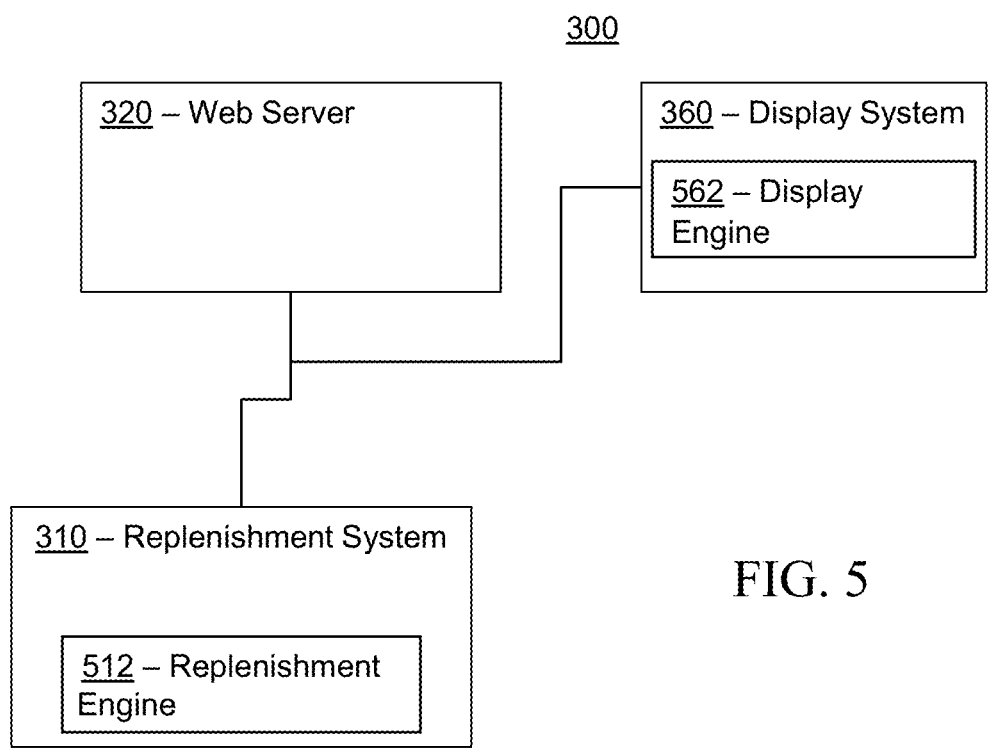
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processors and configured to be stored at one or more non-transitory memory storage systems. Such non-transitory memory storage systems can be part of a computer system such as replenishment system 310, web server 320, and/or display system 360 (FIGS. 3 & 5). The processor(s) can be similar or identical to the processor(s) described above with respect to computer system 100 (FIG. 1).

In many embodiments, the techniques described herein can reduce the network load on system 300. For example, by finding precisely which items the users desire to replenish, the cart-filling process of the users can be expedited. In several embodiments, replenishment system 310 can identify items to be replenished for a user and/or expedite the cart-filling process. In a number of embodiments, system 300 can beneficially allow users to avoid searching for items using long, tedious browsing of multiple webpages by reducing the number of webpages loaded and the number of search queries run. For example, a user can run fewer search queries when presented with relevant content of recommendations based on a personal replenishment cycle of the user to recommend a desired item to the user, which can beneficially reduce the amount of computing resources used to service the search queries, and/or can advantageously mitigate problems with available bandwidth, reduce network traffic, and/or improve management of cache memory.

In many embodiments, the techniques described herein can provide several technological improvements. Specifically, the techniques described herein can reduce network load by enabling a more precise cart recommendation for the user. This method can take into account the items that the user has stopped replenishing, thus removing unnecessary items from the recommendation systems and freeing up space to store recommendations, which also can provide faster processing.

Many embodiments of method 400 can advantageously be used to determine a personal replenishment cycle estimation with missing data. Many users of both online retailers and brick and mortar stores buy some items on a regular basis for a certain time period. Users often stop purchasing items when the user no longer needs the item, such as growing out of the item or switching brand allegiance. For example, a family with a newborn might have regular need for diapers until the baby grows up, at which time the family no longer needs diapers. By way of another example, a household might regularly buy a particular brand of dishwasher soap, and then switch to a new brand.

Furthermore, even when two users are buying the same item regularly, there could be notable difference in how frequently the two users replenish the item. For example, even if two users regularly buy the same dishwasher soap of the same brand and the same size on a regular basis, a first user might buy the dishwasher soap every three months, whereas a second user might buy the dishwasher soap every four months. Reminding users to replenish an item well before the user's personal replenishment cycle has expired can lead to a negative experience for the user. Therefore, estimating the personal replenishment cycle for each user and each item from historical sales data of a retailer can be beneficial for a retailer.

Historical sales data from a retailer typically contains information on the purchase pattern of an item by a user only when the user has purchased the item from the retailer in the past. The historical sales data, however, cannot reflect the entire history of when the user replenished that particular item, as the user might have purchased the item from a different retailer one or more times. Thus, a retailer can have only partial information for a past replenishment patterns for any particular item each user has purchased.

Various embodiments of method 400 can be used in detecting the personal replenishment cycles of every user for every item in the cart of the user using only the historical sales data available to a retailer. Various embodiments of method 400 also can be used in detecting when a user has stopped replenishing a particular item. Using information derived from one or more activities of method 400, a personalized list of recommended items that a user might want to replenish can be determined for the user at any given time.

While recommending to a user a personalized list of items to replenish, the last purchase date for each item from historical sales data of the retailer can be considered. The possibility that the last time a user chose to replenish an item was with another retailer, however, also can be considered. Various embodiments of method 400 can advantageously be used to build a personalized replenishment list that takes into account when to expect that the user might have replenished an item from another retailer, even though such an event is not reflected in historical sales data of the retailer. Various embodiments of method 400 also can subsequently remove the item from the replenishment list for the user and/or move the item lower in priority or later in time in the replenishment list, thus exhibiting the lesser relevance of the item for the user right after such a replenishment.

In a number of embodiments, method 400 can provide several technological improvements. For example, the techniques described herein can be different from previous approaches, which did not consider possibilities of users replenishing items from other retailers and thus, would keep displaying items that the user might have replenished from another retailer, which reduces relevance of the recommendations and leads to additional or increased browsing and searching by the user to find the items they are looking for at any retailer. Moreover, previous approaches did not consider the user growing out of the items, which causes the list of recommended items to keep growing, and involves more storage and processing times. In several embodiments, method 400 can limit the list of recommended items to those items that the user keeps replenishing, which can provide a more concise, relevant list, which can limit storage usage and reduce computer processing times.

In many embodiments, method 400 can comprise an activity of estimating personal replenishment cycles. In some embodiments, a first set of rules can be used to estimate personal replenishment cycles for users. With respect to the first set of rules, let $X_k^{cid,i}$ be the time between the (k−1)-th and k-th replenishment for user cid and item i as obtained from the historical data of a retailer, where k represents the index used to enumerate the number of times the user cid replenished item i from the retailer, and $X_k^{cid,i}$ is defined as the vector whose k-th element represents the length of time between the k-th and (k+1)th replacement for user cid and item i from the retailer. Note that $X_k^{cid,i}$ only measures the time between the (k−1)-th and k-th replenishment of user cid and item i from the retailer. Because there is no guarantee that user cid will always choose the same retailer to replenish item i, $X_k^{cid,i}$ might actually represent sum of many replenishment cycles for the (user, item) pair. Let $K_k^{cid,i}$ be the number of replenishments for item i that user cid has made since the user last bought the item from the retailer associated with the historical sales data, where the count includes the k-th replenishment from the retailer, where $N^{cid,i}$ is defined as the vector of the number of times user cid replenished item i between consecutive replenishments from the current retailer. For example, if the (k−1)-th and k-th replenishment of item i by user cid from the retailer associated with the historical sales data are indeed two consecutive replenishments of item i by user cid, $K_k^{cid,i}=1$. If user cid replenished item i only one time from another retailer in between the (k−1)-th and k-th replenishment from the retailer associated with the historical sales data, then $K_k^{cid,i}=2$. Let $d^{cid,i}$ be the mean replenishment cycle for user cid and item i, where d represents the mean gap between consecutive replenishments of item i by user cid, which can be from different retailers. The relationship between the variables can be assumed as follows:

$$X_k^{cid,i} = N_k^{cid,i} d^{cid,i} + \in_k^{cid,i}, \quad (2.1)$$

where $\in_k^{cid,i}$ are independent and identically distributed random variables for each (user, item) pair (cid, i) with expectation $E[\in_k^{cid,i}]=0$ and variance $Var[\in_k^{cid,i}]=(\sigma^{cid,i})^2$, where σ represents the standard deviation of the length of time between consecutive replenishments of item i by user cid, ∈ represents the vector of deviations in length of time from the mean gap between consecutive replenishment of item i by user cid, and E represents the expectation function which computes the mean of the random variable.

Accordingly, method 400 can comprise an activity 405 of applying a first set of rules to historical sales data available to a retailer to detect a personal replenishment cycle for an item of a set of items purchased by a user. In some embodiments, the personal replenishment cycle for the item purchased by the user can comprise an estimated time period of how often the user purchases the item. Furthermore, in some embodiments, the historical sales data can comprise a record of the user purchasing the item on one or more dates.

More particularly, in some embodiments, the first set of rules can comprise identifying a time, $X_k^{cid,i}$, between a (k−1)-th replenishment and a k-th replenishment for the user, cid, and the item, i, as obtained from the historical sales data of the retailer. The first set of rules can further comprise identifying a number of replenishments, $N_k^{cid,i}$, for the item, i, that the user, cid, has made since the user last bought the item from the retailer, wherein the number of replenishments includes the k-th replenishment from the retailer. The first set of rules can further comprise identifying a mean replenishment cycle, $d^{cid,i}$, for the user, cid, and the item, i. The first set of rules can further comprise assuming a relationship of a model, $X_k^{cid,i}=N_k^{cid,i}d^{cid,i}+\in_k^{cid,i}$, where $\in_k^{cid,i}$ are random variables that are (1) mutually independent of one another and (2) identically distributed for a (user, item) pair (cid, i) with expectation $E[\in_k^{cid,i}]=0$ and variance $Var[\in_k^{cid,i}]=(\sigma^{cid,i})^2$. The first set of rules can further comprise assuming a number of inter-replenishment times, $K^{cid,i}$, for the (user, item) pair (cid, i) from the historical sales data of the retailer given by $\{X_k^{cid,i}, k=1, 2, \ldots, K^{cid,i}\}$. The first set of can further comprise estimating parameters of the model, $X_k^{cid,i}=N_k^{cid,i}d^{cid,i}+\in_k^{cid,i}$, given by $\{d^{cid,i}, \sigma^{cid,i}, N_k^{cid,i}, k=1, 2, \ldots, K^{cid,i}\}$.

In many embodiments, an estimate of the parameters in the model (2.1) is necessary. Assume $K^{cid,i}$ is a number of inter-replenishment times for the (user, item) pair (cid, i) from the historical sales data of the retailer given by $\{X_k^{cid,i}, k=1, 2, \ldots, K^{cid,i}\}$. An estimate of the parameters of the model in (2.1) given by $\{d^{cid,i}, \sigma^{cid,i}, k=1, 2, \ldots, K^{cid,i}\}$ can be determined.

More particularly, for the estimation of the parameters in the model (2.1), an optimization problem can be solved as:

$$\min_{d^{cid,i}, \{N_k^{cid,i}, k=1,2,\ldots, K^{cid,i}\}} \sum_{k=1}^{K^{cid,i}} \left(X_k^{cid,i} - N_k^{cid,i} d^{cid,i}\right)^2 + \alpha \left(\sum_{k=1}^{K^{cid,i}} (N_k^{cid,i})2\right)$$

$$d^{cid,i} > 0,$$

$$\text{s.t. } N_k^{cid,i} \in \{1, 2, 3, \ldots\} \forall k = 1.2 \ldots, K^{cid,i},$$

where $\alpha \geq 0$ is a penalization constant, s.t. is an abbreviation for 'such that', and $\forall k$ is a representation of for all k. Once a solution of the optimization problem (2.2) is obtained, $\sigma^{cid,i}$ can be estimated as $$\hat{\sigma}^{cid,i} = \sqrt{\frac{1}{K^{cid,i}} \sum_{k=1}^{K^{cid,i}} \left(X_k^{cid,i} - \hat{N}_k^{cid,i} \hat{d}^{cid,i}\right)^2} \quad (2.3)$$

where $\hat{d}^{cid,i}$, $\{\hat{N}_k^{cid,i}, k=1, 2, \ldots, K^{cid,i}\}$ are optimal solutions of the optimization problem (2.2), where $\hat{\sigma}^{cid,i}$ is the standard deviation of the vector of deviations from mean gap between consecutive replenishments, $\hat{N}_k^{cid,i}$ is defined as the estimated number of times the user cid has replenished item i between the k-th and (k−1)-th replenishment of item i from the retailer. Thus, if the optimization problem (2.2) is solved for each (user, item) pair (cid, i), then the set of estimates $\{\hat{d}^{cid,i}, \hat{\sigma}^{cid,i}, \hat{N}_k^{cid,i}, k=1, 2, \ldots, K^{cid,i}\}$ can be obtained for each (user, item) pair (cid, i), where $\hat{d}^{cid,i}$ is defined as an estimated mean interval after which user cid replenishes item i, which may not be from the same retailer. In this case, $d^{cid,i}$ and $\hat{\sigma}^{cid,i}$ can be estimates of the mean and standard deviation of personal replenishment cycle lengths for user cid and item i. As will be described in greater detail below, estimates $\{\hat{N}_k^{cid,i}, k=1, 2, \ldots, K^{cid,i}\}$ can be used to assess when the user cid has grown out of or no longer purchases the item i and will no longer replenish the item from the retailer. Also note that $d^{cid,i}$ and $\sigma^{cid,i}$ obtained from a solution of optimization problem (2.2) are only preliminary estimates of the mean and the standard deviation of personal replenishment cycle lengths for user cid and item i, and these estimates can be revised at a later time. However, note that potentially $\hat{d}^{cid,i}$ and $\hat{\sigma}^{cid,i}$ vary with each different (user, item) pair (cid, i), and thus this modeling allows the differences in replenishment cycle lengths for each user and each item to be captured.

Once the preliminary estimates of $\{\hat{d}^{cid,i}, \hat{\sigma}^{cid,i}, \hat{N}_k^{cid,i}, k=1, 2, \ldots, K^{cid,i}\}$ for each (user, item) pair (cid, i) are obtained, the preliminary estimates can be updated as follows. From the catalog of the retailer, items belonging to the same category/subcategory can be found and groups of similar items can be formed. For each user cid, a vector of $(\hat{d}^{cid,i_1}, \hat{d}^{cid,i_2}, \ldots, \hat{d}^{cid,i_n})$ can be formed, where items $(i_1, i_2, \ldots, i_n)$ belong to the same group. $\hat{d}^{cid,i_j}=0$ can be chosen if there is not enough information to estimate $\hat{d}^{cid,i_j}$ for an item $i_j$ and a user cid (because user cid either did not buy item $i_j$ at all or bought it too few times from the retailer associated with the historical sales data), where j represents an index used to enumerate items. The users can then be clustered by the vectors $(\hat{d}^{cid,i_1}, \hat{d}^{cid,i_2}, \ldots, \hat{d}^{cid,i_n})$. Therefore, for each group of items, one set of clusters of users can be obtained. If the users are not clustered, all users can be perceived as part of one large cluster comprising all users for the subsequent discussion.

For each group of items and for each user cid in cluster C, percentile vectors for user cid given by $((p^{cid,i_1}, p^{cid,i_2}, \ldots, p^{cid,i_n})$ can be determined, where each $p_k^{cid,i_j}$ is computed as follows:

$$p^{cid,i_j} = \begin{cases} \dfrac{|\{cid^1 \epsilon C: d^{cid',i_j} > 0, \leq d^{cid',i_j}\}|}{|\{cid' \epsilon C: d^{cid',i_j} > 0\}|} & \text{if } d^{cid,i_j} > 0 \\ 0 & o.w. \end{cases} \quad (2.4)$$

Note that the percentile vector of a user indicates how extreme the replenishment cycle lengths of the user are compared to the cluster for the group of items $(i_1, i_2, \ldots, i_n)$, where o.w. represents an abbreviation of "otherwise," and p is defined as a matrix of measurements where each row represents a user and each column represents an item and the entry of the value corresponding to user cid, and item $i_j$ is a measurement of how extreme the mean replenishment gaps of user cid for item $i_j$ is. For each user cid and item $i_j$, $0 \leq p^{cid,i_j} \leq 1$. For each fixed user cid, the values $p^{cid,i_j}$ should be comparable because the group of items $(i_1, i_2, \ldots, i_n)$ are similar. So, for each user cid, when a $p^{cid,i_j}$ value becomes too different from the set of values $\{p^{cid,i_{j'}}: p^{cid,i_j}>0, j' \in \{1, 2, \ldots, n\}\}$, something can be wrong in estimation of $d^{cid,i_j}$. The value of $d^{cid,i_j}$ can then be updated. To do that, for each user cid, the $p_1$-th and $p_2$-th percentile of $\{p^{cid,i_{j'}}: p^{cid,i_j}>0, j' \in \{1, 2, \ldots, n\}\}$, $p_1 \leq 0.5 \leq p_2$ can be determined, denoted by $p_1^{cid}$ and $p_2^{cid}$. For each user cid and item $i_j$, if $0 < p^{cid,i_j} < p_1^{cid}$, $d^{cid,i_j}$ can be updated as the $p_1^{cid}$-th percentile of $\{d^{cid',i_j}: d^{cid',i_j}>0, cid' \in C\}$. Similarly, for each user cid and item $i_j$ if $p^{cid,i_j} > p_2^{cid}, >0, d^{cid,i_j}$ can be updated as the $p_2^{cid}$-th percentile of $\{d^{cid',i_j}: d^{cid',i_j}>0, cid' \in C\}$. Note that the value $\hat{d}^{cid,i_j}$ if $\hat{d}^{cid,i_j}=0$ is not altered.

Accordingly, for each user cid and item $i_j$, the values of the other parameters of model (2.1) given by $\{\hat{\sigma}^{cid,i}, \hat{N}_k^{cid,i}, k=1, 2, \ldots, K^{cid,i}\}$ can be updated by choosing $\hat{N}_k^{cid,i}$ as the closest integer to $X_k^{cid,i}/\hat{d}^{cid,i_j}$, where $\hat{d}^{cid,i_j}$ is the updated estimate for each $k=1, 2, \ldots, K^{cid,i_j}$ and then using equation (2.3) to revise estimate of $\hat{\sigma}^{cid,i_j}$.

Thus, in many embodiments, estimating the parameters of the model can comprise solving an optimization problem:

$$\min_{d^{cid,i}, \{N_k^{cid,i}, k=1,2,\ldots, K^{cid,i}\}} \sum_{k=1}^{K^{cid,i}} \left(X_k^{cid,i} - N_k^{cid,i} d^{cid,i}\right)^2 + \alpha \left(\sum_{k=1}^{K^{cid,i}} (N_k^{cid,i})^2\right)$$

$$d^{cid,i} > 0,$$

$$\text{s.t. } N_k^{cid,i} \in \{1, 2, 3, \ldots\} \forall k = 1.2 \ldots, K^{cid,i},$$

where $\alpha \geq 0$ is a penalization constant. Estimating the parameters of the model can further comprise estimating $\sigma^{cid,i}$ as $$\hat{\sigma}^{cid,i} = \sqrt{\frac{1}{K^{cid,i}} \sum_{k=1}^{K^{cid,i}} \left( X_k^{cid,i} - \hat{N}_k^{cid,i} \hat{d}^{cid,i} \right)^2}$$

where $\hat{d}^{cid,i}$, $\{\hat{N}_k^{cid,i}, k=1, 2, \ldots, K^{cid,i}\}$ are optimal solutions of the optimization problem. Estimating the parameters of the model can further comprise solving the optimization problem for the (user, item) pair (cid, i), to obtain a set of estimates $\{\hat{d}^{cid,i}, \hat{\sigma}^{cid,i}, \hat{N}_k^{cid,i}, k=1, 2, \ldots, K^{cid,i}\}$ for the (user, item) pair (cid, i), where $\hat{d}^{cid,i}$ is an estimate of a mean and $\hat{\sigma}^{cid,i}$ is an estimate of a standard deviation of the personal replenishment cycle for the user, cid, and the item, i.

Moreover, activity 405 can optionally further comprise additional activities of updating the set of estimates $\{\hat{d}^{cid,i}, \hat{\sigma}^{cid,i}, \hat{N}_k^{cid,i}, k=1, 2, \ldots, K^{cid,i}\}$ for the (user, item) pair (cid, i) by: (1) identifying one or more items of the set of items belonging to a category; (2) creating one or more groups of similar items of the set of items; (3) creating, for the user, cid, a vector of $(\hat{d}^{cid,i_1}, \hat{d}^{cid,i_2}, \ldots, \hat{d}^{cid,i_n})$ where items $(i_1, i_2, \ldots, i_n)$ belong to a group of the one or more groups; and (4) if $\hat{d}^{cid,i_j}$ for the item, $i_j$, and the user, cid, cannot be estimated, then selecting $\hat{d}^{cid,i_j}=0$. In some embodiments, activity 405 can further comprise an additional activity of, for the user, cid, in a cluster, C, identifying one or more percentile vectors for the user, cid, given by $((p^{cid,i_1}, p^{cid,i_2}, \ldots, p^{cid,i_n}))$, where each $p^{cid,i_j}$ is determined as follows:

$$p^{cid,i_j} = \begin{cases} \left\{ \frac{|\{cid' \in C: d^{cid',i_j} > 0, \leq d^{cid',i_j}\}|}{|\{cid' \in C: d^{cid',i_j} > 0\}|} \right\} & \text{if } d^{cid,i_j} > 0 \\ 0 & \text{o.w.} \end{cases}$$

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, system 300 (FIG. 3) can assess renunciation of user with respect to a certain item. As is frequently observed, after buying an item regularly for a certain period, users can grow out of the item, and/or no longer replenish the item. There might be various reasons for this potential renunciation, such as, but not limited to, a user no longer needing the item, the user switching to a substitute item or brand, and so on. To recommend to the user a personalized list of items to replenish, an assessment of when a user has grown out of the product and no longer wishes to replenish the product from the retailer is needed. Such an assessment can be determined as described in greater detail below.

From historical sales data of the retailer, the probability that, after x many missed replenishment cycles, that a user comes back and replenishes the item can be assessed. To do so, the following activities can be performed. For each user cid and each item i, the maximum MAXGAP$^{cid,i}$=max$\{\hat{N}_k^{cid,i}, k=1, 2, \ldots, K^{cid,i}\}$ can be determined, where MAXGAP represents the maximum number of times the user cid has skipped replenishing item i from the current retailer. For each item i and each cluster C, the p-th percentile of $\{$MAXGAP$^{cid,i}$: cid$\in$C$\}$ can be determined, denoted by $p^{C,i}$, where C is defined as a cluster of users. Assuming that the estimation of the parameters of the model (2.1) are accurate, if a user is picked at random from the cluster C, and the historical purchase patterns on item i for the user are reviewed, there is only (1–p) % probability that the user came back to replenish item i after not replenishing the item for $p^{C,i}$ replenishment cycles. If a user cid$\in$C has bought item i last from the retailer more than $(p^{C,i} \times \hat{d}^{cid,i})$ days before, that is, the user did not replenish item i for $p^{C,i}$ replenishment cycles, it is concluded that the user cid has likely grown out of item i and will no longer replenish the item. Intuitively, based on historical sales data of the retailer, there is only (1–p) % probability of user cid buying item i again after $(p^{C,i} \times \hat{d}^{cid,i})$ days.

Accordingly, method 400 can further comprise an activity 410 of applying a second set of rules to identify if the user has stopped purchasing the item. This can be done by estimating a date when the item should have been purchased next, and checking to see if the user purchased the item by that date. In many embodiments, the second set of rules can comprise determining a maximum MAXGAP$^{cid,i}$=max$\{\hat{N}_k^{cid,i}, k=1, 2, \ldots, K^{cid,i}\}$ for the user, cid, and the item, i, where $\hat{N}_k^{cid,i}$ is a closest integer to $X_k^{cid,i_j}/\hat{d}^{cid,i_j}$, $\hat{d}^{cid,i_j}$ is an updated estimate for each k=1, 2, $\ldots$, K$^{cid,i_j}$, $X_k^{cid,i}$ is a time between a (k–1)-th replenishment and a k-th replenishment for the user, cid, and the item, i, as obtained from the historical sales data of the retailer, K$^{cid,i}$ is a number of inter-replenishment times for a (user, item) pair (cid, i) from the historical sales data of the retailer given by $\{X_k^{cid,i}, k=1, 2, \ldots, K^{cid,i}\}$. Moreover, $\hat{N}_k^{cid,i}$ can be an estimate of N solved from the optimization problem. The second set of rules can further comprise, for the item, i, and a cluster, C, of users including the user, determining a p-th percentile of $\{$MAXGAP$^{cid,i}$: cid$\in$C$\}$, denoted by $p^{C,i}$. The second set of rules can further comprise if the user cid$\in$C has bought the item, i, last from the retailer more than $(p^{C,i} \times \hat{d}^{cid,i})$ days before a predetermined day, determining that the user, cid, will no longer replenish the item, i.

In many embodiments, personalized replenishment list can be determined for a user. A personalized replenishment list can take into account many signals, such as, but not limited to, how much the user likes a product, how close the user is to his/her replenishment cycle for the product, the chances of the user choosing the retailer for replenishing the product over other retailers, what items the retailer wants to promote, and so on. Described in greater detail below is a ranking of a likelihood that a user will replenish the product at a certain point in time.

In some embodiments, $X^{cid,i}$ can be an elapsed time from the last time user cid bought item i from the retailer associated with the historical sales data. Similar to (2.1), there can be assumption that this elapsed time $X^{cid,i}$ could be modeled as $$X^{cid,i} = N^{cid,i} d^{cid,i} + \epsilon^{cid,i}, \qquad (2.5)$$

where $\epsilon^{cid,i}$ for different (user, item) pairs are independent random variables and the random variable $\epsilon^{cid,i}$ for (user, item) pair (cid, i) has an expectation $E[\epsilon^{cid,i}]=0$ and a variance $Var[\epsilon^{cid,i}]=(\sigma^{cid,i})^2$.

Note that once the parameters $N^{cid,i}$, $d^{cid,i}$, $\sigma^{cid,i}$ have been estimated in (2.5), an estimate of $\epsilon^{cid,i}$ can be obtained. This estimate is an estimate of time difference between the current time, or the time at which the estimation is made, and the closest replenishment cycle of the user. The replenishment need not necessarily be made from the retailer associated with the historical sales data. In some embodiments, estimates of the parameters $d^{cid,i}$ and $\sigma^{cid,i}$ in (2.5) have previously been obtained using the activities described above. Thus, an estimate of $N^{cid,i}$ is needed and can be estimated as:

$$N^{cid,i} = \begin{cases} \left\lceil \frac{X^{cid,i}}{d^{cid,i}} \right\rceil, & \text{if } \left\lceil \frac{X^{cid,i}}{d^{cid,i}} \right\rceil \hat{d}^{cid,i} - X^{cid,i} \leq X^{cid,i} - \left\lfloor \frac{X^{cid,i}}{d^{cid,i}} \right\rfloor \hat{d}^{cid,i}, \\ \left\lfloor \frac{X^{cid,i}}{d^{cid,i}} \right\rfloor & o.w. \end{cases} \quad (2.6)$$

As long as the distribution of $\varepsilon^{cid,i}$ is assumed to be unimodal and symmetric, this estimate $\hat{N}^{cid,i}$ given in (2.6) can correspond to a maximum likelihood estimate of $N^{cid,i}$, given $\hat{d}^{cid,i}$ is the chosen estimate of $d^{cid,i}$.

Once all the parameters are estimated, for each user cid, all items i can be removed from consideration where $\hat{N}^{cid,i} > p^{C,I}$ and where user cid belongs to cluster C. In other words, for each user, the items which the user will no longer replenish, as assessed, can be eliminated. Then $\varepsilon^{cid,i}$ as $\varepsilon^{cid,i} = (X^{cid,i} - \hat{N}^{cid,i}\hat{d}^{cid,i})$ for each user cid and the remaining set of items for the user can be estimated. A score for each remaining (user, item) pair using the hazard rate used to rank the items for the user can be determined. The hazard rate can be determined by assuming $\varepsilon^{cid,i}$ follows normal distribution. The cumulative distribution function and density function of standard normal distribution can be denoted as $\Phi(\bullet)$ and $\emptyset(\bullet)$, respectively, where $\Phi(\bullet)$ is the cumulative distribution function of standard normal distribution, and $\emptyset(\bullet)$ is defined as the probability density function of the standard normal distribution. The score, therefore, for the (user, item) pair (cid, i) can be determined as:

$$\text{Score}(cid, i) = \frac{\phi\left(\frac{\hat{\varepsilon}^{cid,i}}{\hat{\sigma}^{cid,i}}\right)}{1 - \Phi\left(\frac{\hat{\varepsilon}^{cid,i}}{\hat{\sigma}^{cid,i}}\right)}. \quad (2.7)$$

The score given in (2.7) can be used to rank the items for each user cid. This ranking method, intuitively, ranks the items according to what user cid is most likely to replenish today or in the current session.

Accordingly, method 400 can further comprise an activity 415 of applying a third set of rules to the personal replenishment cycle for the item to identify a personalized list of recommended items for the user to consider replenishing. In some embodiments, applying the third set of rules to the personal replenishment cycle for the item to identify the personalized list of recommended items for the user to consider replenishing can comprise applying the third set of rules to the personal replenishment cycle for the item to identify (1) the personalized list of recommended items for the user to consider replenishing, and/or (2) a likelihood that the user has purchased the item from a different retailer.

In many embodiments, the third set of rules can comprise identifying an elapsed time, $X^{cid,i}$, since the user, cid, bought the item, i, from the retailer. In many embodiments, the third set of rules can further comprise modeling the elapsed time, $X^{cid,i}$, as $X^{cid,i} = N^{cid,i}d^{cid,i} + \varepsilon^{cid,i}$, where $\varepsilon^{cid,i}$ for different (user, item) pairs are independent random variables and each random variable of the independent random variables $\varepsilon^{cid,i}$ for the (user, item) pair (cid, i) has an expectation $E[\varepsilon^{cid,i}] = 0$ and variance $\text{Var}[\varepsilon^{cid,i}] = (\sigma^{cid,i})^2$, and $d^{cid,i}$ is a mean replenishment cycle, for the user, cid, and the item, i. In many embodiments, the third set of rules can further comprise estimating a number of replenishments, $N^{cid,i}$, for the item, i, that the user, cid, has made since the user last bought the item from the retailer as $$N^{cid,i} = \begin{cases} \left\lceil \frac{X^{cid,i}}{d^{cid,i}} \right\rceil, & \text{if } \left\lceil \frac{X^{cid,i}}{d^{cid,i}} \right\rceil \hat{d}^{cid,i} - X^{cid,i} \leq X^{cid,i} - \left\lfloor \frac{X^{cid,i}}{d^{cid,i}} \right\rfloor \hat{d}^{cid,i}, \\ \left\lfloor \frac{X^{cid,i}}{d^{cid,i}} \right\rfloor & o.w. \end{cases}$$

where $X^{cid,i}$ is a time elapsed from the user's cid last purchase of item i from the store, $d^{cid,i}$ is an estimated mean replenishment cycle for user cid and item i from the model, $\sigma^{cid,i}$ is a corresponding standard deviation estimated from the model, and $N^{cid,i}$ is an estimate of which replenishment of the user and item i is being targeted by the store since the user cid since the last purchase of item i by the user from the store. In many embodiments, the third set of rules can further comprise removing from consideration any items from the set of items if $\hat{N}^{cid,i} > p^{C,i}$, where the user, cid, belongs to a cluster, C, of users. In many embodiments, the third set of rules can further comprise estimating $\varepsilon^{cid,i}$ as $\varepsilon^{cid,i} = (X^{cid,i} - \hat{N}^{cid,i}\hat{d}^{cid,i})$ for the user, cid, and the remaining set of items for the user. In many embodiments, the third set of rules can further comprise determining a score for each remaining (user, item) pair using a hazard rate.

Method 400 can further comprise an activity 420 of coordinating displaying the personalized list of recommended items on an interface of a user electronic device of the user. In some embodiments, activity 420 can comprise generating instructions for providing a graphical user interface on the user electronic device that displays the personalized list of recommended items. Moreover, at any point before or during implementation of method 400, system 300 (FIG. 3) can coordinate displaying item information and/or a promotion for an item on a device such as user computer 340 and/or 341 (FIG. 3). Similarly, system 300 (FIG. 3) can generate instructions for providing an interface on the user electronic device (i.e., user computer 340 (FIG. 3)) that displays the item information and/or the promotion for the item.

Figure 7:
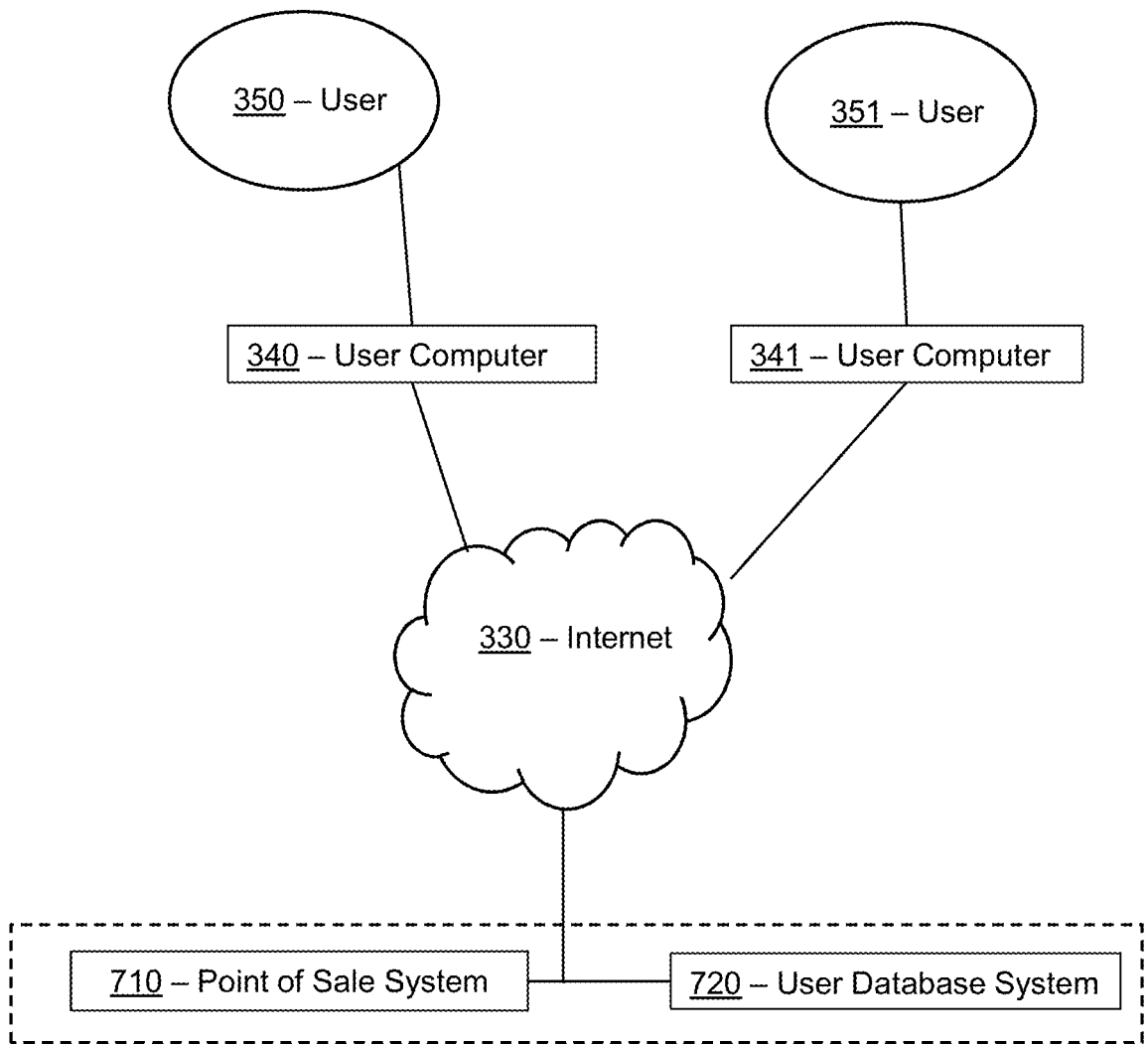
FIG. 7 illustrates a representative block diagram of a system, according to an additional embodiment.

In some embodiments, method 400 can optionally comprise an activity of receiving, at a point of sale system 710 (FIG. 7), receipts of the set of items purchased by the user. Method 400 also can optionally comprise an activity of analyzing, at point of sale system 710 (FIG. 7), the set of items. Method 400 further can optionally comprise an activity of determining, at point of sale system 710 (FIG. 7), the estimated time period of when the user will again purchase the item of the set of items. The estimated time period can include an estimated next purchase date for the item. Determining the estimated time period can comprise applying the first set of rules. Method 400 also can optionally comprise an activity of transferring an identification of the item and the estimated next purchase date from point of sale system 710 (FIG. 7) to a user database system 720 (FIG. 7). In many embodiments, these activities can increase efficiency of system 300 by not requiring a second copy of the receipt to be made at the user database system 720 (FIG. 7).

FIG. 5 illustrates a block diagram of a portion of system 300 comprising replenishment system 310, web server 320, and display system 360, according to the embodiment shown in FIG. 3. Each of replenishment system 310, web server 320, and/or display system 360 is merely exemplary and not limited to the embodiments presented herein. Each of replenishment system 310, web server 320, and/or display system 360 can be employed in many different embodiments or examples not specifically depicted or described herein. In some embodiments, certain elements or engines of replenishment system 310, web server 320, and/or display system 360 can perform various procedures, processes, and/or acts. In other embodiments, the procedures, processes, and/or acts can be performed by other suitable elements or engines.

In many embodiments, replenishment system 310 can include computer-readable media including computing instructions, which can be referred to as replenishment engine 512. In many embodiments, replenishment engine 512 can store computing instructions configured to run on one or more processors and perform one or more acts of method 400 (FIG. 4) (e.g., activity 405 of applying a first set of rules to historical sales data available to a retailer to detect a personal replenishment cycle for an item of a set of items purchased by a user, activity 410 of applying a second set of rules to identify if the user has stopped purchasing the item, and activity 415 of applying a third set of rules to the personal replenishment cycle for the item to identify a personalized list of recommended items for the user to consider replenishing (FIG. 4)).

In many embodiments, display system 360 can include computer-readable media including computing instructions, which can be referred to as display engine 562. In many embodiments, display engine 562 can store computing instructions configured to run on one or more processing systems and perform one or more acts of method 400 (FIG. 4) (e.g., activity 420 of coordinating displaying the personalized list of recommended items on an interface of a user electronic device of the user (FIG. 4)).

Figure 6A:
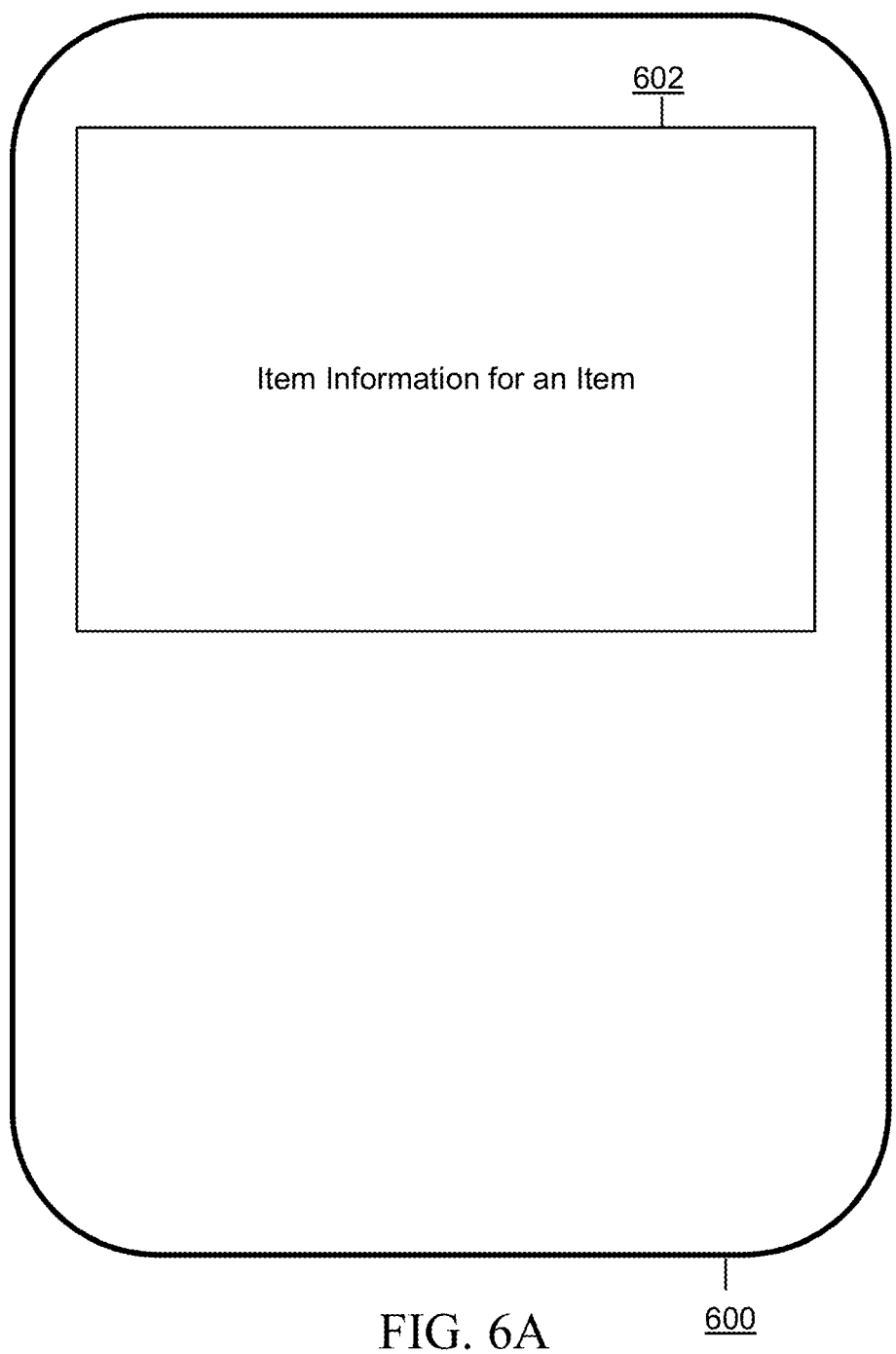
FIGS. 6A-C illustrate representative block diagrams of a user interface, according to an embodiment.

Turning ahead in the drawings to FIG. 6A, which illustrates a diagram of an interface 600. In many embodiments, interface 600 can be displayed on a screen of user computer 340 (FIG. 3). In many embodiments, interface 600 can display item information for an item 602 of a set of items available for sale from a retailer and purchased by the user at a first time.

Figure 6B:
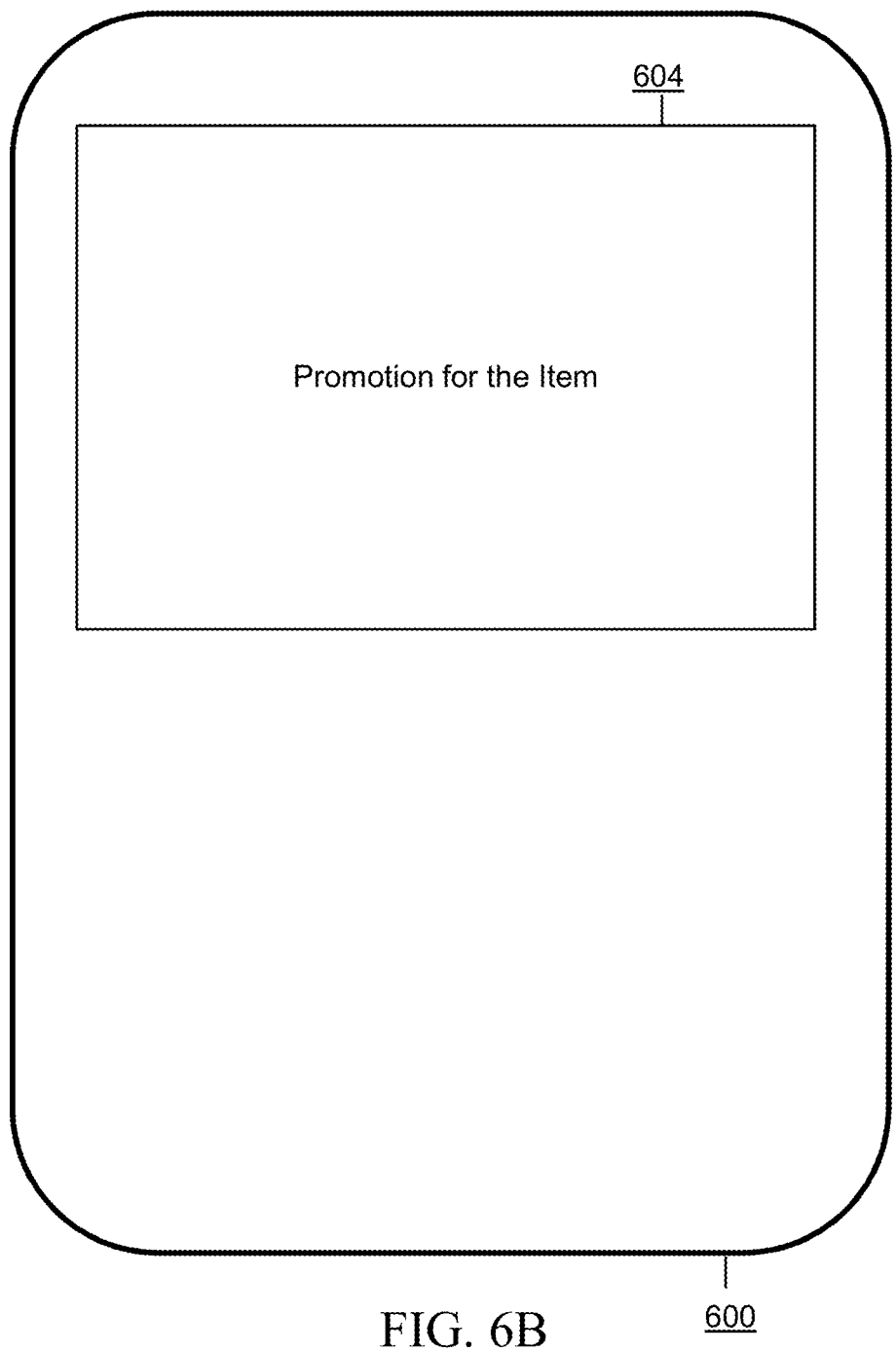

Turning ahead in the drawings to FIG. 6B, which illustrates another diagram of an interface 600. In many embodiments, interface 600 can display, at a second time after the first time, a promotion for the item 604. In some embodiments, (1) the second time is within a predetermined time period from completion of a personal replenishment cycle for the item that began at the first time, (2) the personal replenishment cycle for the item can comprise an estimated time period of how often the user purchases the item as determined by applying a set of rules to historical sales data for the item, and/or (3) the historical sales data can comprise a record of the user purchasing the item on one or more dates.

Figure 6C:
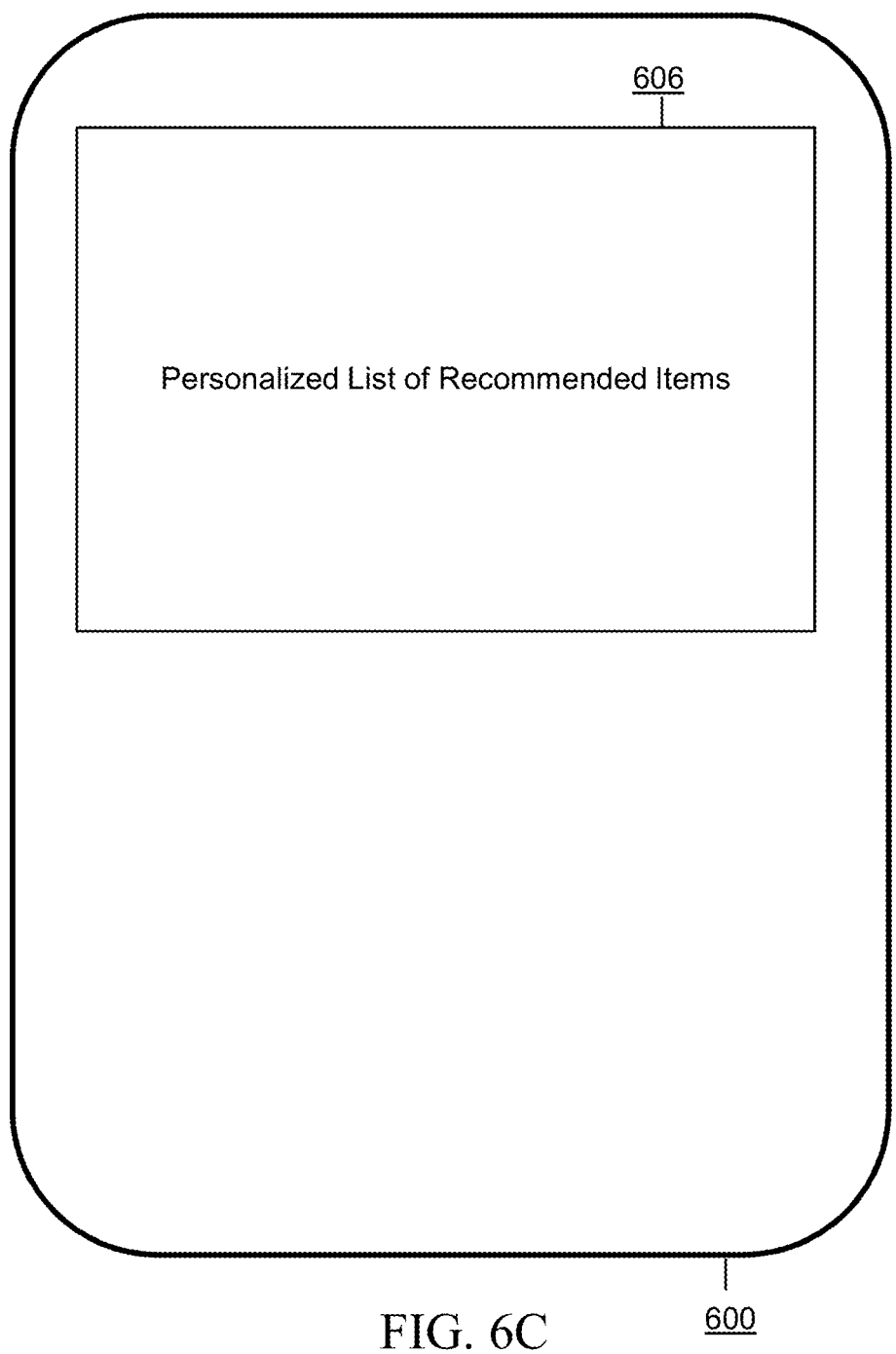

Turning ahead in the drawings to FIG. 6C, which illustrates another diagram of an interface 600. In many embodiments, interface 600 can display a personalized list of recommended items 606 determined by applying another set of rules to the personal replenishment cycle. As an example, the personalized list of recommended items 606 can be the list that is coordinated to be displayed in activity 420 (FIG. 4).

Turning ahead in the drawings, FIG. 7 illustrates a block diagram of a system 700 that can be employed for predicting missed cycles. System 700 is merely exemplary and embodiments of the system are not limited to the embodiments presented herein. System 700 can be employed in many different embodiments or examples not specifically depicted or described herein. In some embodiments, certain elements or engines of system 700 can perform various procedures, processes, and/or activities. In these or other embodiments, the procedures, processes, and/or activities can be performed by other suitable elements or engines of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In some embodiments, system 700 can include point of sale system 710 and user database lay system 720. Point of sale system 710 and user database system 720 can each be a computer system, such as computer system 100 (FIG. 1), as described above, and can each be a single computer, a single server, or a cluster or collection of computers or servers, or a cloud of computers or servers. In another embodiment, a single computer system can host each of two or more of point of sale system 710 and user database system 720.

In many embodiments, system 700 can provide several technological improvements. By reducing the network load, system 700 helps improve CPU, memory and cache performance for underlying recommendation systems. Also, by making the recommendations more relevant for each user, these techniques can reduce the number of pages that a user visits before making a purchase. This directly reduces the number of service calls per second and provides improved usage of various system components like CPU, memory, hard disk, etc.

In many embodiments, the techniques described herein can provide one or more technical improvements. For example, the techniques described herein can provide a more precise cart recommendation for the user. This method can take into account the items that the user has stopped replenishing, which can remove unnecessary items from the recommendation systems and free up space to store recommendations, which also can provide faster processing. In conventional approaches, users can find the items by long, tedious browsing of multiple webpages, and possibly running several search queries to find their desired item. Therefore, the techniques described herein can reduce the number of pages the network loads and the search queries run for the users to fill their carts.

The techniques described herein can be rooted in computer technologies to overcome existing problems in database systems, which can increase available bandwidth, reduce network traffic, and efficiently manage databases. Conventional database systems cannot handle massive amounts of network traffic or database requests, while keeping latency to an acceptable level and/or avoiding server crashes. The techniques described herein can provide a technical solution, such as one that utilizes databases in a novel arrangement. This technology-based solution can provide an improvement over existing computing capabilities and functionalities related to database systems by improving bandwidth, reducing network traffic, and permitting greater database efficiency, such as by processing combined read/delete requests. The systems can improve the way databases store, retrieve, delete, and/or transmit data.

A number of embodiments can include a system. The system can include one or more processors and one or more non-transitory computer-readable media storing computing instructions configured to run on the one or more processors and perform coordinating displaying a personalized list of recommended items on a graphical user interface of a user electronic device of a user. Coordinating displaying can occur after applying a first set of rules to historical sales data available to a retailer to detect a personal replenishment cycle for an item of a set of items purchased by the user. The personal replenishment cycle for the item purchased by the user can comprise an estimated time period of how often the user purchases the item. The historical sales data can comprise a record of the user purchasing the item on one or more dates. Coordinating displaying can further occur after applying a second set of rules to identify if the user has stopped purchasing the item. Coordinating displaying also can occur after applying a third set of rules to the personal replenishment cycle for the item to identify the personalized list of recommended items for the user to consider replenishing.

Various embodiments include a method being implemented via execution of computing instructions configured to run at one or more processors and configured to be stored at non-transitory computer-readable media. The method can include coordinating displaying a personalized list of recommended items on a graphical user interface of a user electronic device of a user. Coordinating displaying can occur after applying a first set of rules to historical sales data available to a retailer to detect a personal replenishment cycle for an item of a set of items purchased by the user. The personal replenishment cycle for the item purchased by the user can comprise an estimated time period of how often the user purchases the item. The historical sales data can comprise a record of the user purchasing the item on one or more dates. Coordinating displaying further can occur after applying a second set of rules to identify if the user has stopped purchasing the item. Coordinating displaying also can occur after applying a third set of rules to the personal replenishment cycle for the item to identify the personalized list of recommended items for the user to consider replenishing.

A number of embodiments can include a system. The system can include one or more processors and one or more non-transitory computer-readable media storing computing instructions configured to run on the one or more processors and perform certain acts. The acts can include displaying, on a user interface of an electronic device of a user, item information for an item of a set of items available for sale from a retailer and purchased by the user at a first time. The acts also can include displaying, on the user interface of the electronic device at a second time after the first time, a promotion for the item. The second time can be within a predetermined time period from completion of a personal replenishment cycle for the item that began at the first time. The personal replenishment cycle for the item can comprise an estimated time period of how often the user purchases the item as determined by applying a first set of rules to historical sales data for the item. The historical sales data can comprise a record of the user purchasing the item on one or more dates. The acts additionally can include displaying, on the user interface, a personalized list of recommended items determined by applying a second set of rules to the personal replenishment cycle.

Several embodiments include a system. The system can include one or more processors and one or more non-transitory computer-readable media storing computing instructions configured to run on the one or more processors and perform certain acts. The acts can include coordinating displaying a personalized list of recommended items on a graphical user interface of a user device of a user. Coordinating displaying the personalized list of recommended items can occur after determining a personal replenishment cycle for an item of a set of items previously purchased by the user by executing a first set of rules on historical sales data available to a retailer. Coordinating displaying the personalized list of recommended items also can occur after increasing available storage space in the one or more non-transitory computer-readable media of the system by removing a first item from the set of items based on executing a second set of rules to identify that the user has stopped purchasing the first item. Coordinating displaying the personalized list of recommended items additionally can occur after increasing a network bandwidth of the system by reducing a number of database requests for the set of items previously purchased by the user based on executing a third set of rules on the personal replenishment cycle for the item. The third set of rules can include identifying an elapsed time since the user bought the item from the retailer. The third set of rules also can include estimating a number of times the user has replenished the item. Further, the third set of rules can include estimating a number of times the user has replenished remaining items of the set of items. Additionally, the third set of rules can include determining a score for each remaining (user, item) pair including the respective user, item information.

Some embodiments include a method being implemented via execution of computing instructions configured to run on one or more processors and stored on one or more non-transitory computer-readable media. The method can include coordinating displaying a personalized list of recommended items on a graphical user interface of a user device of a user. Coordinating displaying the personalized list also can occur after determining a personal replenishment cycle for an item of a set of items previously purchased by the user by executing a first set of rules on historical sales data available to a retailer. Coordinating displaying the personalized list also can occur after increasing available storage space in the one or more non-transitory computer-readable media of the system by removing a first item from the set of items based on executing a second set of rules to identify that the user has stopped purchasing the first item. Coordinating displaying the personalized list additionally can occur after increasing a network bandwidth of the system by reducing a number of database requests for the set of items previously purchased by the user based on executing a third set of rules on the personal replenishment cycle for the item. The third set of rules can include identifying an elapsed time since the user bought the item from the retailer. Further the third set of rules also can include estimating a number of times the user has replenished the item. Additionally, the third set of rules can include estimating a number of times the user has replenished remaining items of the set of items. The third set of rules also can include determining a score for each remaining (user, item) pair including the respective user, item information.

Although systems and methods for estimating personal replenishment cycles have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments. For example, one or more of the procedures, processes, or activities of FIG. 4 can include different procedures, processes, and/or activities and be performed by many different systems and/or engines, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform operations comprising:
      coordinating displaying a personalized list of recommended items on a graphical user interface of a user device of a user, wherein the coordinating displaying occurs after:
         determining a personal replenishment cycle for an item of a set of items previously purchased by the user by executing a first set of rules on historical sales data available to a retailer;
         increasing available storage space in the one or more non-transitory computer-readable media of the system by removing a first item from the set of items based on executing a second set of rules to identify that the user has stopped purchasing the first item; and
         increasing a network bandwidth of the system by reducing a number of database requests for the set of items previously purchased by the user based on executing a third set of rules on the personal replenishment cycle for the item, wherein the third set of rules comprises:
            identifying an elapsed time since the user bought the item from the retailer;
            estimating a number of times the user has replenished the item;
            estimating a number of times the user has replenished remaining items of the set of items; and
            determining a score for each remaining (user, item) pair comprising a respective user, item information.

2. The system of claim 1, wherein the computing instructions, when executed on the one or more processors, further cause the one or more processors to perform operations comprising:
   receiving, at a point of sale system, receipts of the set of items purchased by the user;
   analyzing, at the point of sale system, the set of items, wherein executing the first set of rules further comprises determining, at the point of sale system, an estimated time period when the user will again purchase the item of the set of items, and wherein the estimated time period includes an estimated next purchase date for the item;
   and
   transferring an identification of the item and the estimated next purchase date from the point of sale system to a user database system.

3. The system of claim 1, wherein the computing instructions, when executed on the one or more processors, further cause the one or more processors to perform operations comprising:
   displaying, on the graphical user interface of the user device of the respective user, item information for the item of the set of items available for sale from the retailer and purchased by the user at a first time;
   displaying, on the graphical user interface of the user device at a second time after the first time, a promotion for the item, wherein (1) the second time is within a predetermined time period from completion of a personal replenishment cycle for the item that began at the first time, and (2) executing the first set of rules on the historical sales data for the item further comprises determining an estimated time period during which the user will purchase the item again, and (3) the historical sales data comprises a record of the user purchasing the item on one or more dates, wherein increasing the available storage space further comprises identifying a first personalized list of items the user has stopped purchasing, wherein the first personalized list of items comprises the first item; and
   displaying, on the graphical user interface, a second personalized list of recommended items, wherein executing the third set of rules to the personal replenishment cycle further comprises determining the second personalized list of recommended items.

4. The system of claim 1, wherein determining the personal replenishment cycle comprises:
   detecting the personal replenishment cycle for the item of the set of items purchased by the user, wherein (1) the personal replenishment cycle for the item purchased by the user comprises an estimated time period of how often the user purchases the item and (2) the historical sales data comprises a record of the user purchasing the item on one or more dates; and
   identifying a time between a $(k-1)$-th replenishment and a k-th replenishment for the user and the item as obtained from the historical sales data of the retailer.

5. The system of claim 1, wherein the first set of rules comprises:
   identifying a number of replenishments for the item that the user has made since the user last bought the item from the retailer, wherein the number of replenishments includes a k-th replenishment from the retailer;
   identifying a mean replenishment cycle for the user and the item;
   assuming a relationship of a model based on using independent random variables that are (1) mutually independent of one another and (2) identically distributed random variables for a (user, item) pair with an expectation and a variance, wherein the (user, item) pair comprises the respective user, item information;
   assuming a number of inter-replenishment times for the (user, item) pair from the historical sales data of the retailer; and
   estimating parameters of the model.

6. The system of claim 5, wherein estimating the parameters of the model comprises:
  solving an optimization problem for the (user, item) pair, to obtain a set of estimates for the (user, item) pair, based on an estimate of a mean of the set of estimates and an estimate of a standard deviation of the personal replenishment cycle for the user and the item.

7. The system of claim 6, wherein the computing instructions, when executed on the one or more processors, further cause the one or more processors to perform operations comprising:
  updating a set of estimates for the (user, item) pair by:
    identifying one or more items of the set of items belonging to a category;
    creating one or more groups of similar items of the set of items;
    creating, a vector for the user and the set of items, wherein items of the set of items belong to a same group of the one or more groups; and
    when the vector for the item and the user cannot be estimated, selecting the vector equal to zero; and
  for the user in a cluster of users who purchase the item, identifying one or more percentile vectors for the user.

8. The system of claim 1, wherein the second set of rules comprises:
  determining a MAXGAP for the user and the item, wherein the MAXGAP is a maximum number of times the user skipped replenishing the item based on a time between a (k−1)-th replenishment and a k-th replenishment for the user as obtained from the historical sales data of the retailer;
  for the item and a cluster of users, including the user, who purchase the item, determining a p-th percentile of the MAXGAP of the user of the cluster of users; and
  when the user of the cluster of users has bought the item last from the retailer more than an N number of days before a predetermined day:
    determining that the user will no longer replenish the item; and
    removing the item from the personal replenishment cycle of the item for the user.

9. The system of claim 1, wherein the third set of rules further comprises:
  identifying the personalized list of recommended items for the user to consider replenishing, and a likelihood that the user has purchased the item from a different retailer;
  modeling an elapsed time using at least different (user, item) pairs, wherein a (user, item) pair of the at least different (user, item) pairs comprises independent random variables, wherein each independent random variable of the independent random variables comprises a respective expectation and a respective variance; and wherein the respective variance comprises a respective mean replenishment cycle based on the (user, item) pair corresponding to an estimated standard deviation; and
  estimating a number of replenishments of the item that the user has made since the user last bought the item from the retailer, wherein the number of replenishments of the item comprises the number of times the user has replenished the item.

10. The system of claim 9, wherein the third set of rules further comprises:
  removing from consideration any items from the set of items greater than a p-th percentile of MAXGAP for the item, where the user belongs to a cluster of users who purchase the item; and
  estimating the independent random variables for the user and the remaining items of the set of items for the user.

11. A method being implemented via execution of computing instructions configured to run on one or more processors and stored one or more non-transitory computer-readable media, the method comprising:
  coordinating displaying a personalized list of recommended items on a graphical user interface of a user device of a user, wherein the coordinating displaying occurs after:
    determining a personal replenishment cycle for an item of a set of items previously purchased by the user by executing a first set of rules on historical sales data available to a retailer;
    increasing available storage space in the one or more non-transitory computer-readable media of a system by removing a first item from the set of items based on executing a second set of rules to identify that the user has stopped purchasing the first item; and
    increasing a network bandwidth of the system by reducing a number of database requests for the set of items previously purchased by the user based on executing a third set of rules on the personal replenishment cycle for the item, wherein the third set of rules comprises:
      identifying an elapsed time since the user bought the item from the retailer;
      estimating a number of times the user has replenished the item;
      estimating a number of times the user has replenished remaining items of the set of items; and
      determining a score for each remaining (user, item) pair comprising a respective user, item information.

12. The method of claim 11, further comprising:
  receiving, at a point of sale system, receipts of the set of items purchased by the user;
  analyzing, at the point of sale system, the set of items, wherein executing the first set of rules further comprises determining, at the point of sale system, an estimated time period when the user will again purchase the item of the set of items, and wherein the estimated time period includes an estimated next purchase date for the item;
  and
  transferring an identification of the item and the estimated next purchase date from the point of sale system to a user database system.

13. The method of claim 11 further comprising:
  displaying, on the graphical user interface of the user device of the respective user, item information for the item of the set of items available for sale from the retailer and purchased by the user at a first time;
  displaying, on the graphical user interface of the user device at a second time after the first time, a promotion for the item, wherein (1) the second time is within a predetermined time period from completion of a personal replenishment cycle for the item that began at the first time, and (2) executing the first set of rules on the historical sales data for the item further comprises determining an estimated time period during which the user will purchase the item again, and (3) the historical sales data comprises a record of the user purchasing the item on one or more dates, wherein increasing the available storage space further comprises identifying a first personalized list of items the user has stopped purchasing, wherein the first personalized list of items comprises the first item; and displaying, on the graphical user interface, a second personalized list of recommended items, wherein executing the third set of rules to the personal replenishment cycle further comprises determining the second personalized list of recommended items.

14. The method of claim 11, wherein determining the personal replenishment cycle comprises:

detecting the personal replenishment cycle for the item of the set of items purchased by the user, wherein (1) the personal replenishment cycle for the item purchased by the user comprises an estimated time period of how often the user purchases the item and (2) the historical sales data comprises a record of the user purchasing the item on one or more dates; and identifying a time between a (k−1)-th replenishment and a k-th replenishment for the user and the item as obtained from the historical sales data of the retailer.

15. The method of claim 11, wherein the first set of rules comprises:

identifying a number of replenishments for the item that the user has made since the user last bought the item from the retailer, wherein the number of replenishments includes a k-th replenishment from the retailer;

identifying a mean replenishment cycle for the user and the item;

assuming a relationship of a model based on using independent random variables that are (1) mutually independent of one another and (2) identically distributed random variables for a (user, item) pair with an expectation and a variance, wherein the (user, item) pair comprises the respective user, item information;

assuming a number of inter-replenishment times for the (user, item) pair from the historical sales data of the retailer; and estimating parameters of the model.

16. The method of claim 15, wherein estimating the parameters of the model comprises:

solving an optimization problem for the (user, item) pair, to obtain a set of estimates for the (user, item) pair, based on an estimate of a mean of the set of estimates and an estimate of a standard deviation of the personal replenishment cycle for the user and the item.

17. The method of claim 16 further comprising:
updating a set of estimates for the (user, item) pair by:
identifying one or more items of the set of items belonging to a category;
creating one or more groups of similar items of the set of items;
creating, a vector for the user and the set of items, wherein items of the set of items belong to a same group of the one or more groups; and when the vector for the item and the user cannot be estimated, selecting the vector equal to zero; and for the user in a cluster of users who purchase the item, identifying one or more percentile vectors for the user.

18. The method of claim 11, wherein the second set of rules comprises:

determining a MAXGAP for the user and the item, wherein the MAXGAP is a maximum number of times the user skipped replenishing the item based on a time between a (k−1)-th replenishment and a k-th replenishment for the user as obtained from the historical sales data of the retailer;

for the item and a cluster of users, including the user, who purchase the item, determining a p-th percentile of the MAXGAP of the user of the cluster of users; and when the user of the cluster of users has bought the item last from the retailer more than an N number of days before a predetermined day:
determining that the user will no longer replenish the item; and
removing the item from the personal replenishment cycle of the item for the user.

19. The method of claim 11, wherein the third set of rules further comprises:

identifying the personalized list of recommended items for the user to consider replenishing, and a likelihood that the user has purchased the item from a different retailer;

modeling an elapsed time using at least different (user, item) pairs, wherein a (user, item) pair of the at least different (user, item) pairs comprises independent random variables, wherein each independent random variable of the independent random variables comprises a respective expectation and a respective variance; and wherein the respective variance comprises a respective mean replenishment cycle based on the (user, item) pair corresponding to an estimated standard deviation; and estimating a number of replenishments of the item that the user has made since the user last bought the item from the retailer, wherein the number of replenishments of the item comprises the number of times the user has replenished the item.

20. The method of claim 19, wherein the third set of rules further comprises:

removing from consideration any items from the set of items greater than a p-th percentile of MAXGAP for the item, where the user belongs to a cluster of users who purchase the item; and estimating the independent random variables for the user and the remaining items of the set of items for the user.

* * * * *